US006806485B2

(12) United States Patent
Jackson, Jr.

(10) Patent No.: US 6,806,485 B2
(45) Date of Patent: Oct. 19, 2004

(54) AMBIENT LIGHT DETECTOR FOR OFF-THE-GLASS RAIN SENSOR

(75) Inventor: James A. Jackson, Jr., Paris (FR)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 30 days.

(21) Appl. No.: 09/750,653

(22) Filed: Dec. 28, 2000

(65) Prior Publication Data

US 2002/0084404 A1 Jul. 4, 2002

(51) Int. Cl.[7] .............................................. G01N 15/06
(52) U.S. Cl. .................. 250/573; 250/205; 250/227.25
(58) Field of Search .......................... 250/227.25, 205, 250/573–575, 208.1, 214 AL, 214 B; 318/483, 484, 444; 315/82, 83

(56) References Cited

U.S. PATENT DOCUMENTS

| | | | |
|---|---|---|---|
| 4,193,093 A | 3/1980 | St. Clair ..................... 348/616 |
| 4,396,950 A | 8/1983 | Roth .......................... 348/298 |
| 4,412,181 A | * 10/1983 | Marguinaud et al. ....... 329/348 |
| 4,591,900 A | 5/1986 | Heeb et al. ................. 348/277 |
| 5,214,272 A | * 5/1993 | Ueno ...................... 250/208.1 |
| 5,264,944 A | 11/1993 | Takemura ................... 386/38 |
| 5,923,027 A | 7/1999 | Stam et al. .............. 250/208.1 |
| 6,020,704 A | 2/2000 | Buschur ..................... 318/483 |
| 6,049,069 A | 4/2000 | Hochstein ................... 219/497 |
| 6,097,023 A | * 8/2000 | Schofield et al. ........ 250/208.1 |
| 6,097,024 A | 8/2000 | Stam et al. .............. 250/208.1 |
| 6,118,383 A | 9/2000 | Hegyi ........................ 340/602 |
| 6,144,022 A | 11/2000 | Tenenbaum et al. ..... 250/208.1 |
| 6,207,967 B1 | * 3/2001 | Hochstein ................ 250/208.1 |
| 6,313,454 B1 | * 11/2001 | Bos et al. ................ 250/208.1 |
| 6,376,824 B1 | * 4/2002 | Michenfelder et al. . 250/214 R |
| 6,465,963 B1 | * 10/2002 | Turnbull et al. .............. 315/82 |

FOREIGN PATENT DOCUMENTS

| | | |
|---|---|---|
| DE | 197 04 818 A1 | 8/1997 |
| DE | 100 05 127 A1 | 8/2001 |
| FR | 2 791 435 | 9/2000 |
| WO | WO 01/05626 A1 | 1/2001 |

* cited by examiner

Primary Examiner—Thanh X. Luu
(74) Attorney, Agent, or Firm—J. Gordon Lewis

(57) ABSTRACT

An optical moisture detector for determining a value corresponding to ambient light conditions and comparing that value to a predetermined value. The detector includes an optical moisture sensor and a processor. The optical moisture sensor can be a photo array, a CCD or a CMOS. The processor can be a microprocessor. The processor can emit a control signal to engage or disengage a light generating device based on the result of the comparison of the value to the predetermined value.

19 Claims, 4 Drawing Sheets

AMBIENT LIGHT DETECTOR FOR OFF-THE-GLASS RAIN SENSOR

FIELD OF THE INVENTION

The invention relates to an optical moisture sensor, and, more specifically, the invention provides an optical moisture sensor for measuring ambient light conditions.

BACKGROUND OF THE INVENTION

A focal plane array of photosensors configured as a CCD or CMOS is capable of sensing the presence of rain or other forms of moisture on a vehicle windshield. In general, a lens or reflective optical element is used to form a real image, in the optical sense, of the objects on the focal plane array and that array is then read by addressing each image element or pixel in the array sequentially. The analog output level of each pixel is a function of the integrated light exposure of that image element and is normally converted into a digital value which is stored in the memory buffer. The aggregate of such sequentially addressed and stored digital pixels constitutes an image frame, which can consist of only a few thousand pixels or over a million pixels in high resolution imagers.

In many imaging applications, such as in a conventional television, the stored digital data that forms the image frame is simply read out and is used to create an analog image on a display screen. Other uses for such digitally stored images include metrology and/or machine vision applications where the digitally stored image frame is subjected to image analysis. Still other uses for such digitally stored images include methods whereby stored image frames are analyzed digitally with certain algorithms, in order to recognize the presence of specific characteristic images. Such images might include water drops, rivulets, mist or even dirt.

A problem with optical moisture sensors has been the number of arithmetic computations required to process analog or digital signals generated by the sensing array of the sensor. The sensing array generates a signal based on the conditions it is exposed to. The signal is received by a processor that interprets the signal. When the signal has been interpreted, it can be acted upon. However, interpreting the signal can require the completion of as many as eight billion computations. The processing power required to complete eight billion computations is significant and so the art of optical moisture sensors has been focused on reducing the number of computations required to interpret a signal from a sensing array.

SUMMARY OF THE INVENTION

The present invention provides an apparatus and method for measuring ambient light conditions. The present invention adds processing operations to the processor of an optical moisture detector in contravention of the prior art. The invention includes an optical moisture sensor for sensing the presence of moisture on a moisture collecting surface. The sensor is operable to emit a signal corresponding to the sensed conditions. The invention also includes a processor for receiving the signal from the optical moisture sensor, determining a value based on the signal, corresponding to existing ambient light conditions, comparing the value to a predetermined value, and emitting a control signal if the value is less than the predetermined value. Existing processors for optical moisture sensors determine a value based on the signal received from the optical moisture sensor, but do not compare the value to another predetermined value. The predetermined value can correspond to a particular level of ambient light. Specifically, the predetermined value can correspond to a level of ambient light at which the driver of an automobile should engage the headlights of the vehicle. The present invention can also include means responsive to the control signal for controlling a light generating device. For example, the present invention can include a controller for vehicle headlights, the controller operable to receive the control signal from the processor and engage the headlights of a vehicle. The present invention can also include a timer for disengaging the processor from comparing the value to the predetermined value for a period of time. The present invention also can include a processor operable to emit the control signal only if at least two successive comparisons indicate the value corresponding to the level of ambient light is less than the predetermined value. The optical moisture sensor of the present invention can be mounted on the windshield of a vehicle or positioned spaced apart from the windshield. The optical moisture sensor of the present invention can be a CCD camera or a CMOS camera.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
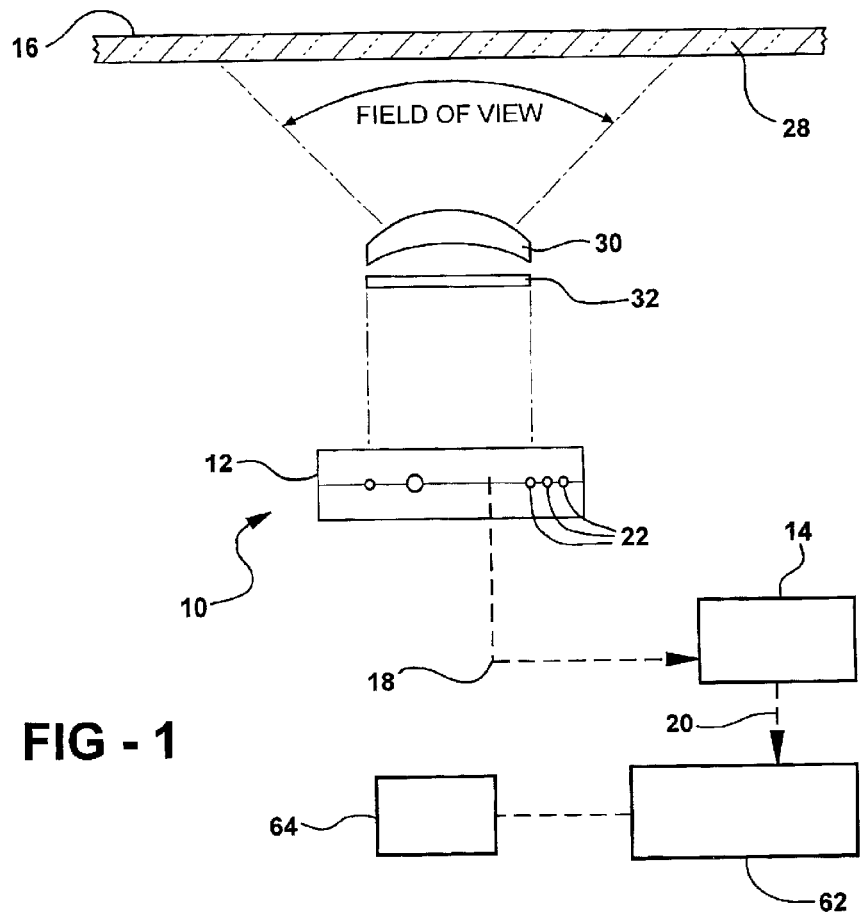
FIG. 1 is a schematic view of an optical moisture sensor operably positionable in a spaced relationship relative to a windshield of a motor vehicle.

The present invention provides an optical moisture detector 10 for measuring ambient light conditions. The optical moisture detector 10 includes an optical moisture sensor 12 and a processor 14. The optical moisture sensor 12 senses the presence of moisture on a moisture collecting surface 16. The optical moisture sensor 12 emits a signal 18 corresponding to the sensed conditions. The processor 14 receives the signal 18 from the optical moisture sensor 12 and interprets, or processes, the signal to determine an absolute ambient light value corresponding to the existing ambient light conditions. The processor 14 compares the value to a predetermined value and emits a control signal 20 if the value is less than the predetermined value.

Figure 6:
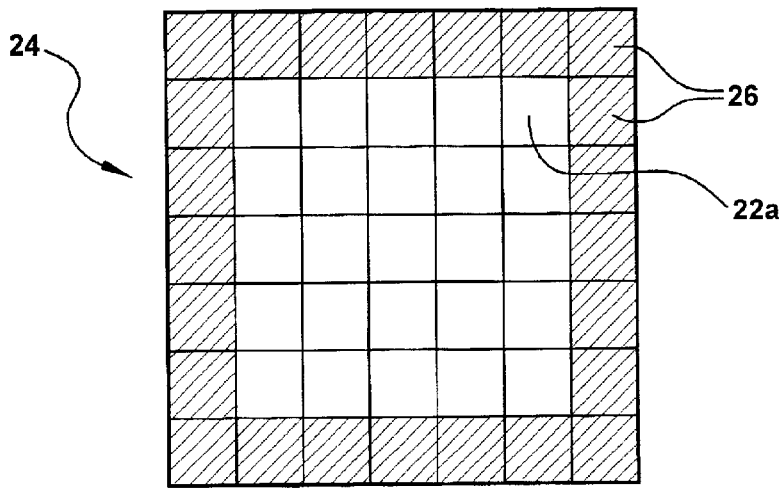
FIG. 6 is a frontal view of an optical moisture sensor according to the present invention having a plurality of dark pixels and a plurality of standard pixels.

An optical moisture sensor 12 is shown in FIG. 1. The optical moisture sensor 12 can include a plurality of pixels 22. The pixels 22 divide an image of the moisture collecting surface 16 into a plurality of elements. Each pixel 22 can be emitted as a signal to the processor 14, or the sensor 12 can emit one cumulative signal 18. The processor 14 determines an absolute ambient light value based on the signal 18 received from sensor 12. The optical moisture sensor 12 can include a photo array 24 having a plurality of dark pixels 26 in addition to a plurality of pixels 22, as shown in FIG. 6. The dark pixels 26 can be used to determine an absolute value of ambient light by comparing a signal from a dark pixel 26 to a signal from a pixel 22a.

Figure 2:
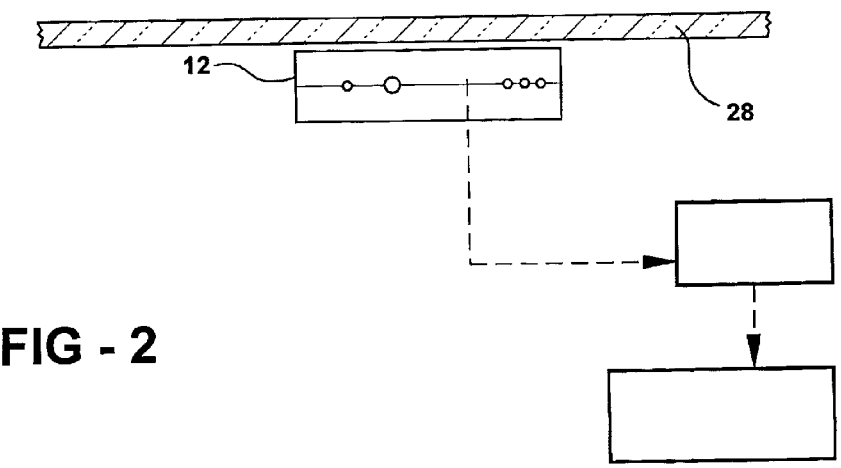
FIG. 2 is a schematic view of an optical moisture sensor operably mountable with respect to a windshield of a motor vehicle.

As shown in FIG. 1, the optical moisture sensor 12 can be operably positionable in a spaced relationship relative to the moisture collecting surface 16. The moisture collecting surface 16 can be the exterior surface of a windshield 28 for a motor vehicle. An imaging lens 30 can be adapted for disposition between the optical moisture sensor 12 and the moisture collecting surface 16. A filter 32 can be positioned between the imaging lens 30 and the optical moisture sensor 12 to allow only illuminating wavelengths of light to pass through to the optical moisture sensor 12, greatly improving the signal-to-noise ratio of the system. The optical moisture sensor 12 can be operably mountable with respect to a windshield 28 of a motor vehicle, as shown in FIG. 2.

The signal 18 can be a digital or analog signal. If the optical moisture sensor 12 is a photo array, the signal 18 can be an analog signal. The processor 14 can receive the analog signal and convert it into a digital signal. If the optical moisture sensor 12 is a CCD or CMOS, the signal 18 can be a digital signal.

Figure 3:
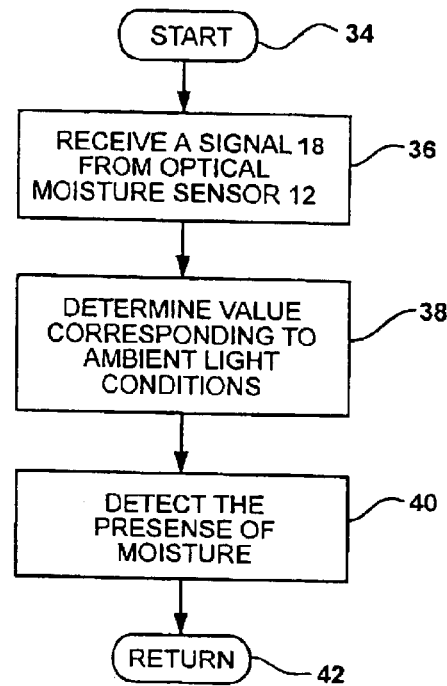
FIG. 3 is a flow chart showing the process steps applied by prior art processors associated with optical moisture sensors.

The processor 14 receives the signal 18, interprets the signal 18 to determine a value of ambient light, compares the value to a predetermined value, and emits a control signal 20 if the value is less than the predetermined value. Optical moisture detectors having a sensor and a processor are well known for use on the windshield of a motor vehicle. The process steps of prior art processors are shown in the simplified flow diagram of FIG. 3. The process starts at step 34. Step 36 receives the signal 18 from the optical moisture sensor 12. Step 38 determines a value corresponding to the level of ambient light based on the signal 18. Step 40 detects the presence of moisture on the moisture collecting surface 16. The detection step 40 is accomplished by the completion of numerous computations. In some prior art processors, eight billion computations were required in order to complete the detection step 40. Improvements in prior art processors for optical moisture detectors have focused on reducing the number of computations required to detect moisture. After step 40, step 42 returns the process back to step 34.

The processor 14 of the present invention provides additional processing steps in contravention of the prior art by adding a call to a new subroutine after step 38 has determined the value corresponding to ambient light conditions.

Figure 4:
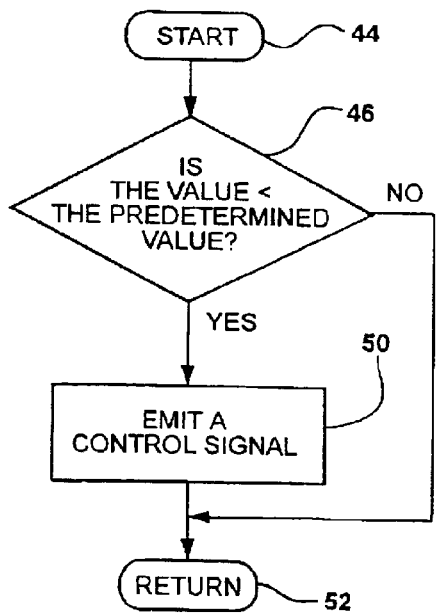
FIG. 4 is a flow chart showing the process steps of a subroutine applied by a processor according to the present invention in addition to the steps applied by prior art processors associated with moisture sensors.

The subroutine according to the present invention is shown in the simplified flow diagram of FIG. 4. The subroutine starts at step 44. Step 46 compares the value to a predetermined value. The predetermined value can correspond to a minimum level of ambient light at which a motor vehicle can be safely driven without headlights. The predetermined value can be a constant number or can be variable. For example, the signal 18 generated by the optical moisture sensor 12 can be affected by the temperature of the optical moisture sensor 12. The predetermined value can be determined to compensate for any such effect. If the value is less than the predetermined value, the subroutine will continue to the next step 50. If the value is equal to or greater than the predetermined value, the subroutine continues to step 52 and returns the processor 14 to the moisture detecting step 40 of FIG. 3.

Figure 5:
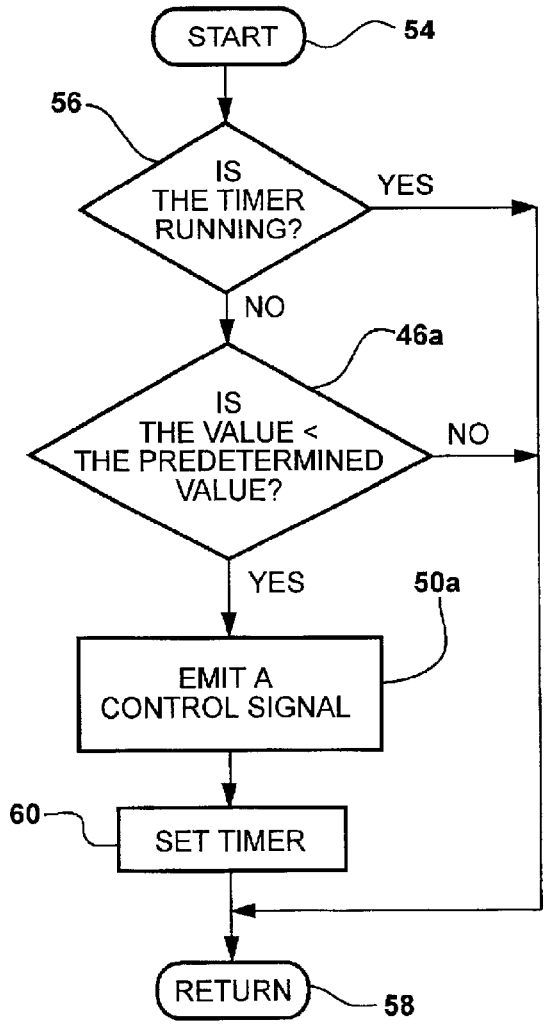
FIG. 5 is a flow chart showing the process steps applied by a processor according to the present invention having a timer.

The processor 14 can also include a timer for selectively disabling the comparison of the value to the predetermined value for a predetermined period of time. The process steps of the timer are shown in the simplified flow diagram of FIG. 5. The process starts at step 54. Step 56 monitors the status of the timer. If the timer is engaged or running, the process continues to step 58 and returns to the step 40 in FIG. 3. Obviously, during a first iteration of the timer process, the timer will not be running. If the timer is not running, steps 46a and 50a are completed. Step 60 engages the timer. The timer process can be desirable to prevent the processor 14 from completing unnecessary comparisons. For example, if the processor 14 determines that the value is less than the predetermined value, corresponding to a relatively lower level of ambient light, the subsequent comparison should also indicate a relatively lower level of ambient light. Completing another comparison to confirm this assumption can be an undesirable use of the processor 14. The amount of time set by step 60 can be from one second to one minute, one minute to five minutes, or five minutes to one hour. Step 58 returns the processor 14 to step 40 of FIG. 3.

The optical moisture detector 10 can also include a controller 62 for a light generating device 64. The controller 62 can respond to the control signal 20 to activate or deactivate the light generating device 64. The light generating device 64 can be an interior light of a motor vehicle, such as a dashboard light or an interior cargo light. The light generating device 64 can be an exterior light of a motor vehicle such as a standard headlight, a high beam headlight, or a fog light.

Figure 7:
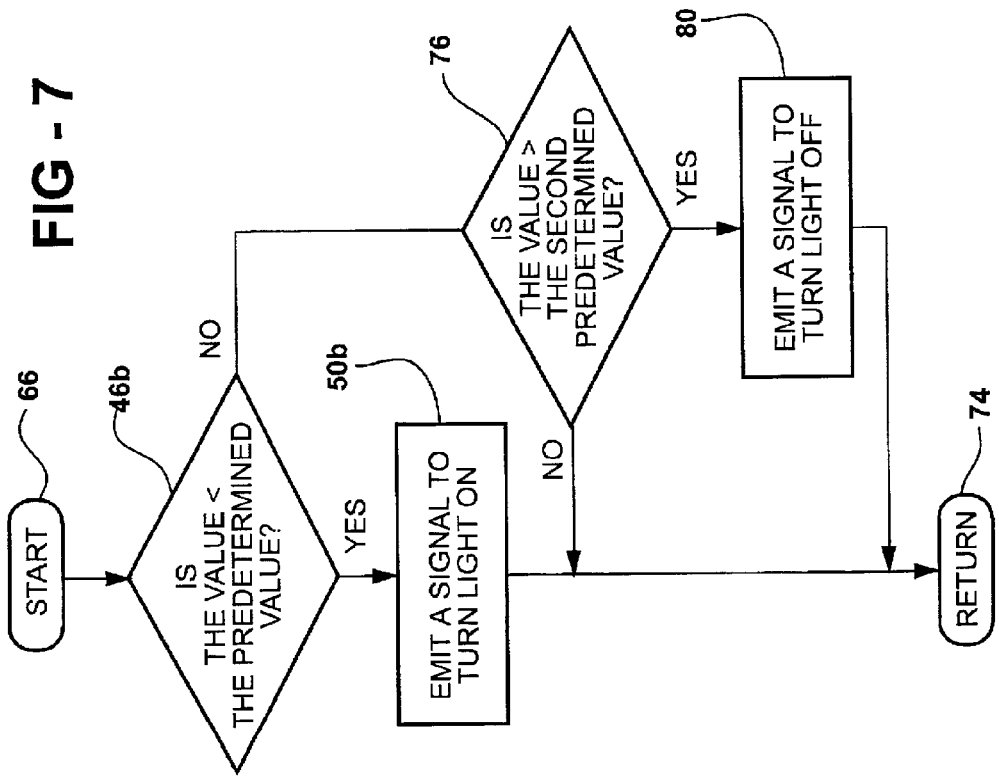
FIG. 7 is a flow chart showing the steps applied by a processor according to the present invention for comparing a value corresponding to a level of ambient light to a first predetermined value and to a second predetermined value.

The processor 14 can be operable to compare the value corresponding to the level of ambient light to a plurality of predetermined values. The process steps of such a processor 14 are shown in the simplified flow diagram of FIG. 7. The process starts at step 66. Step 46b compares the value to a first predetermined value. If the value is less than the first predetermined value, the processor 14 continues to step 50b and emits a control signal 20. Step 74 then returns the processor 14 to step 40 of FIG. 3. If step 46b determines that the value is not less than the predetermined value, the process continues to step 76. Step 76 compares the value to a second predetermined value. If the value is not greater than the second predetermined value, the processor 14 is directed to step 74. If the value is greater than the second predetermined value, step 76 directs the processor 14 to step 80. Step 80 emits a second control signal 20a. The process continues to step 74. Comparing the value to a first predetermined value and a second predetermined value can be desirable in controlling the controller 62 to engage and disengage the light generating device 64. For example, step 50b can emit a control signal 20 that can be a "turn light on" signal. Step 80, on the other hand, can emit a control signal 20a that can be a "turn light off" signal. Both the first predetermined value and the second predetermined value can be constant or can be variable. The difference between the first predetermined value and the second predetermined value can be large enough to provide a range in which a driver can operate a motor vehicle with the light generating device 64 either on or off without interference from the processor 14.

Figure 8:
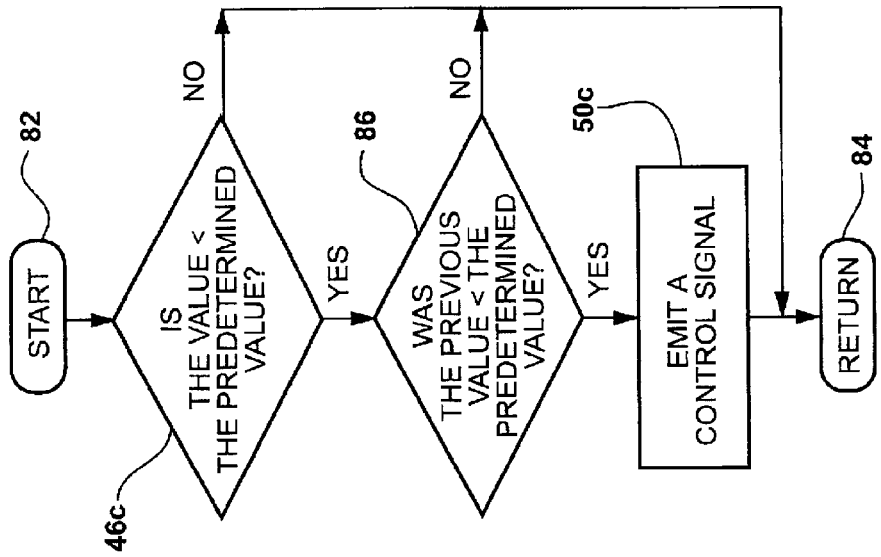
FIG. 8 is a flow chart showing the steps applied by a processor according to the present invention for emitting a control signal only if at least two successive comparisons indicate the value is less than the predetermined value.

The processor 14 can also be operable to emit a control signal 20 only if the value is less than the predetermined value in two or more successive comparisons. The process steps of processor 14 according to this embodiment of the optical moisture detector 10 are shown in the simplified flow diagram of FIG. 8. The process starts at step 82. Step 46c compares the value corresponding to ambient light conditions to a predetermined value. If the value is less than the predetermined value, step 46c directs the process to the return step 84 which directs the processor 14 to step 40 of FIG. 3. If the value is less than the predetermined value, step 46c directs processor 14 to step 86. Step 86 determines whether the previous value corresponding to ambient light conditions was less than the predetermined value. If the previous value was less than the predetermined value, step 86 directs the processor 14 to the return step 84. If the value was less than the predetermined value, step 86 directs the processor 14 to step 50c to emit a control signal 20. It can be desirable to include step 86 to prevent temporary, relatively lower ambient light conditions from resulting in the emission of a control signal 20 from the processor 14.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An optical moisture detector for measuring ambient light conditions comprising:
    an optical moisture sensor having a plurality of dark pixels and a plurality of standard pixels, the sensor operable to emit signals corresponding to sensed conditions at each of the plurality of dark pixels and each of the plurality of standard pixels; and
    processor means for receiving the signals, for determining an absolute ambient light value corresponding to existing ambient light conditions using the signals, and for emitting a control signal if the absolute ambient light value is less than a predetermined value.

2. The optical moisture detector of claim 1 further comprising:
    means, responsive to the control signal, for controlling a light generating device.

3. The optical moisture detector of claim 1 wherein the processor means is operable to compare the absolute ambient light value to a predetermined value, the optical moisture detector further comprising:
    timer means for selectively disabling the processor means from comparing the absolute ambient light value to the predetermined value for a programmed period of time.

4. The optical moisture detector of claim 1 wherein the optical moisture sensor is operably mountable with respect to a windshield of a motor vehicle.

5. The optical moisture detector of claim 1 wherein the optical moisture sensor is operably positionable in a spaced relationship relative to a windshield of a motor vehicle.

6. The optical moisture detector of claim 1 wherein the optical moisture sensor further comprises:
    a CCD camera.

7. The optical moisture detector of claim 1 wherein the optical moisture sensor further comprises:
    a CMOS camera.

8. A The optical moisture detector of claim 1 wherein the processor means further comprises:
    a microprocessor for operably receiving the signals from the sensor.

9. The optical moisture detector of claim 1 wherein the processing means compares the absolute ambient light value to a plurality of predetermined values such that the processing means compares the absolute ambient light value to a first predetermined value to determine if a signal to turn on a light generating device is to be sent, and compares the absolute ambient light value to a second predetermined value to determine if a signal to turn off the light generating device is to be sent.

10. An optical moisture detector for measuring ambient light conditions comprising:
    an optical moisture sensor having a plurality of dark pixels and a plurality of standard pixels for sensing the presence of moisture on a windshield of a vehicle, the sensor operable to emit signals corresponding to sensed conditions at each of the plurality of dark pixels and each of the plurality of standard pixels; and
    processor means for receiving the signals, for determining an absolute ambient light value corresponding to existing ambient light conditions using the signals, and for emitting a control signal if the absolute ambient light value is less than a predetermined value.

11. The optical moisture detector of claim 10 further comprising:
    means, responsive to the control signal, for controlling a light generating device.

12. The optical moisture detector of claim 10 wherein the processor means is operable to compare the absolute ambient light value to a predetermined value, the optical moisture detector further comprising:
    timer means for selectively disabling the processor means from comparing the absolute ambient light value to the predetermined value for a programmed period of time.

13. The optical moisture detector of claim 10 wherein the processor means is operable to compare the absolute ambient light value to a predetermined value, and wherein the processor means emits the control signal only if at least two successive comparisons indicate the absolute ambient light value is less than the predetermined value.

14. The optical moisture detector of claim of claim 10 wherein the optical moisture sensor is operably mountable with respect to a windshield of a motor vehicle.

15. The optical moisture detector of claim of claim 10 wherein the optical moisture sensor is operably positionable in a spaced relationship relative to a windshield of a motor vehicle.

16. A method of measuring ambient light conditions comprising:
    sensing an image with an optical moisture sensor having a plurality of dark pixels and a plurality of standard pixels, the sensor operable to emit signals corresponding to sensed conditions at each of the plurality of dark pixels and each of the plurality of standard pixels;

receiving the signals and determining an absolute ambient light value corresponding to the existing ambient light conditions with processor means using the signals; and emitting a control signal with the processor means if the absolute ambient light value is less than a predetermined value.

17. The method of claim 16 further comprising the step of:

mounting the optical moisture sensor to the windshield of a vehicle.

18. The method of claim 16 further comprising the step of:

disposing the optical moisture sensor in a spatial relationship relative to the windshield of a vehicle.

19. The method of claim 16 further comprising the step of:

controlling a light generating device in response to the control signal.

* * * * *